Patented Jan. 6, 1925.

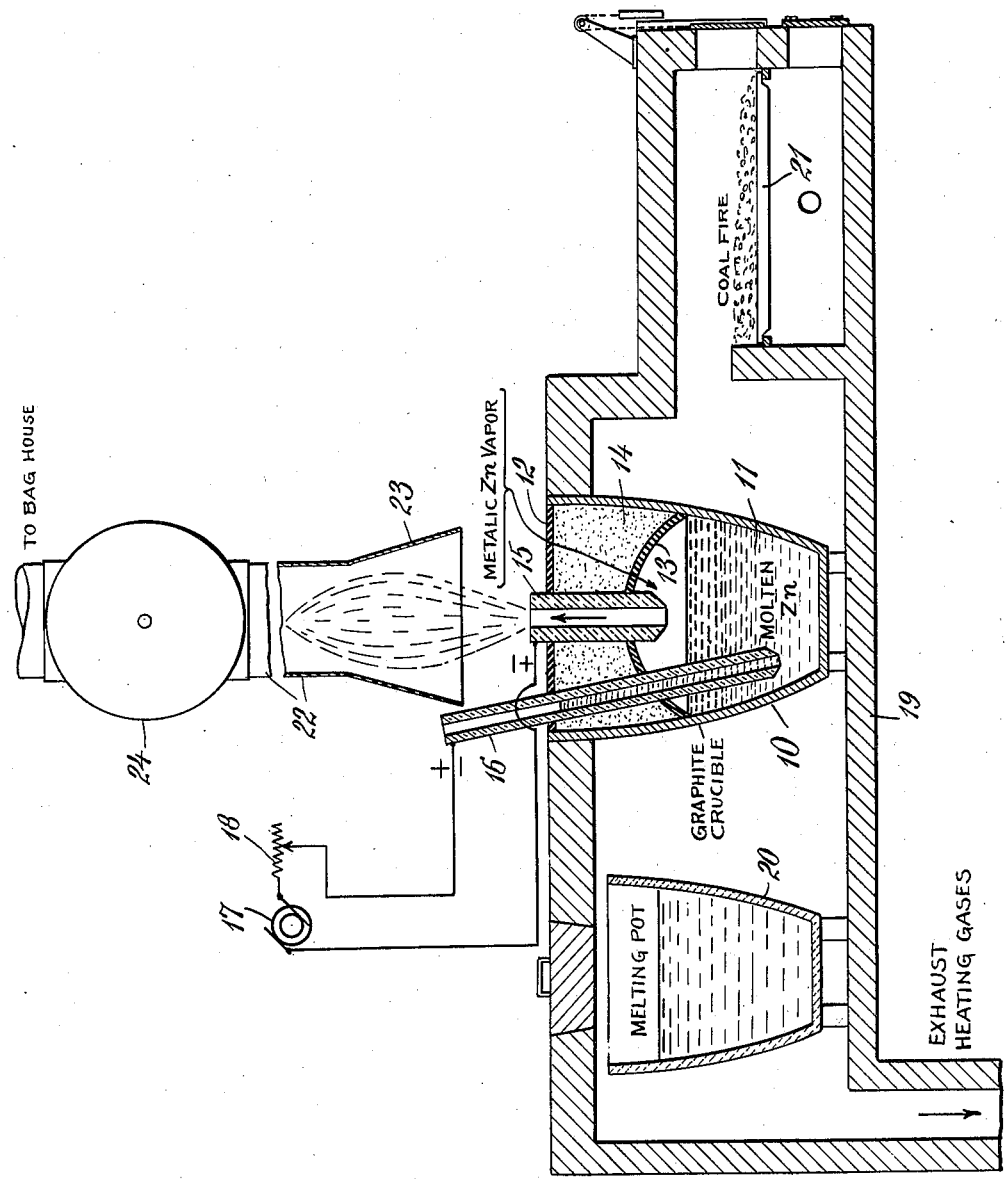

1,522,096

UNITED STATES PATENT OFFICE.

FRANK G. BREYER, EARL C. GASKILL, AND JAMES A. SINGMASTER, OF PALMERTON, PENNSYLVANIA, ASSIGNORS TO THE NEW JERSEY ZINC COMPANY, OF NEW YORK, N. Y., A CORPORATION OF NEW JERSEY.

MANUFACTURE OF ZINC OXIDE.

Application filed May 27, 1921. Serial No. 473,051.

*To all whom it may concern:*

Be it known that we, FRANK G. BREYER, EARL C. GASKILL, and JAMES A. SINGMASTER, citizens of the United States, residing at Palmerton, county of Carbon, State of Pennsylvania, have invented certain new and useful Improvements in the Manufacture of Zinc Oxide; and we do hereby declare the following to be a full, clear, and exact description of the invention, such as will enable others skilled in the art to which it appertains to make and use the same.

This invention relates to the manufacture of zinc oxide, and has for its object the provision of an improved method of manufacturing zinc oxide.

The method of the present invention is applicable for the production of zinc oxide products possessing in large measure the improved qualities characteristic of the zinc oxide products described and claimed in our co-pending application for Letters Patent of the United States, Serial No. 640,846, filed May 23, 1923.

Zinc oxide has long been extensively used in the rubber industry as a reinforcing or strengthening agent. The reinforcing or strengthening quality of zinc oxide in compounded rubber manifests itself in numerous ways. One of the most significant manifestations of this quality is the increased resistance to abrasive wear that zinc oxide imparts to rubber stock properly compounded and cured. This property of imparting increased resistance to abrasive wear makes zinc oxide a particularly valuable reinforcing or strengthening agent in rubber stock which is to be used in the treads of pneumatic vehicle tires or in the body of solid truck tires.

Crude, unreinforced rubber, when cured with the proper amount of sulfur and accelerator, has a low resistance to abrasive wear and is totally unsuited for use as a tire tread stock. The common ground or pulverized pigments, such as barytes, asbestine, silex, infusorial earth, and the like, have very little if any value as reinforcers against abrasion in rubber, and may be classed as true fillers. Finer pigments produced by wet precipitation, such as lithopone, or by wet natural disintegration, such as clay, have some value as reinforcers against abrasion in rubber, particularly if the coarser particles are removed or differentially separated. The very fine fumed pigments, such as zinc oxide and gas black, exhibit to a very marked degree the property of imparting abrasive resistance to rubber. The reinforcing power in rubber of a substance is influenced by both the fineness of its particle size and its chemical composition, and up to the present time it has been found impossible to accurately evaluate the relative importance of the physical properties of a rubber reinforcer (say, for example, zinc oxide) as against its chemical properties. That both properties play a part in determining the rubber reinforcing power of a substance is, however, well recognized by rubber technologists.

The resistance to abrasive wear of compounded rubber has heretofore been commonly measured by manufacturing a vehicle tire with two or more kinds of rubber stock forming separate segments of the tread. This tire is then placed in actual use and the relative rates of wear of the several segments observed and measured. In order to avoid the cost and to shorten the time required for such actual service tests, factory methods of determining the relative abrasive resistance of compounded rubbers have been devised. One such factory method consists in subjecting the several pieces of compounded rubber to the abrasive action of a revolving sharp sand concrete track and comparing the relative volume losses after a predetermined time.

The numerical figures for resistance to abrasion (abrasive indices) given herein have been determined on an abrasion machine of the character described in the Rubber Age, published at New York city, March 10, 1923, pages 403-404.

Heretofore, zinc oxide has been generally produced by either the American (or Wetherill) process, or by the French process; the great bulk of the zinc oxide used in the rubber industry as a reinforcing agent being heretofore manufactured by the American processes. In the production of zinc oxide by the American process, a charge of zinciferous material mixed with a reducing agent and spread on an ignited bed of fuel is subjected to a combustion supporting blast or draft and brought to a sufficiently high temperature to reduce the compounds of zinc and volatilize the reduced metal without bringing the charge to a condition where it becomes impervious to the blast or draft, the zinc vapors being burned above the top of the charge to zinc oxide which is collected in an appropriate manner. In the French process of producing zinc oxide, metallic zinc is melted and volatilized in appropriate receptacles or retorts, under non-oxidizing conditions, and the resulting metallic zinc vapor drifts or flows out of the mouth of the retort at low velocity and burns, in the presence of an excess of air, with a quiet, lazy flame, thereby forming zinc oxide which is collected in any convenient and appropriate manner. The zinc oxide resulting from either of these processes has the physical appearance of an impalpable powder, although the particle size of zinc oxide made by the American process is usually somewhat larger than the particle size of French process zinc oxide.

Our improved method of producing zinc oxide, in its preferred form, involves volatilizing metallic zinc and superheating the resulting zinc vapor, preferably by means of electrical energy and preferably to a temperature above 2000° C., and oxidizing the superheated zinc vapor, preferably by projecting the superheated zinc vapor at relatively high velocity into an oxidizing environment. As applied to the production of our improved zinc oxide, (our aforementioned application Serial No. 640,846,) the method of the invention involves so burning superheated vapor of metallic zinc as to produce particles of zinc oxide of extreme fineness and then so rapidly cooling these particles after their formation as to substantially prevent sublimation and growth thereof.

In its broader aspect, the invention contemplates an improved method of producing zinc oxide characterized by oxidizing metallic zinc vapor so as to produce particles of zinc oxide of extreme fineness, and so rapidly cooling these initially fine particles of zinc oxide, (preferably by a draft of cooling air of appropriate volume), that no substantial growth in particle size takes place. The more nearly instantaneous is the cooling of the particles of zinc oxide after their formation, the finer is the particle size of the resulting product. In carrying out the invention, in accordance with one of our successfully practiced embodiments thereof, a highly superheated vapor of metallic zinc is shot from its source into an oxidizing environment surrounded by heat absorbing media of sufficient heat absorbing capacity to cause the removal of the heat carried and generated by the combusting zinc vapor and the products of combustion in the shortest possible time. In accordance with our preferred practice, the removal of the heat carried and generated by the combusting zinc vapor and the products of combustion is effected at such a rapid rate that the superheated zinc vapor oxidizes or burns with a sputtering and snapping flame.

In the practice of the method of the invention, we have obtained excellent results by the use of electric energy as the source of heat for producing the desired superheating of the metallic zinc vapor and have secured the desired removal of heat from the combusting zinc vapors and the products of combustion by maintaining the surrounding heat absorbing media at the proper temperatures by means of large quantities of air. A suitable arrangement of apparatus embodying electric energy as the source of heat and means for utilizing large volumes of cooling air for maintaining the surrounding heat absorbing media at the required temperatures is illustrated in the accompanying drawing: the single figure of the drawing being a sectional elevation, largely diagrammatic, of the apparatus. It will, of course, be understood that other sources of heat and other forms of apparatus may be employed in the practice of the method of the invention, and in the accompanying drawing we have illustrated merely for purposes of illustration one form of apparatus which we have found in practice to give excellent results.

The apparatus illustrated in the drawing comprises a graphite crucible 10 adapted to contain an appropriate quantity of metallic zinc 11. The crucible is closed by a cover 12 and an arched roof 13, the space between which is filled with heat insulating material 14, such, for example, as sil-o-cel. The cover 12, roof 13 and insulating filler 14 are securely mounted in the upper part of the crucible 10 to withstand the pressures of six pounds, or more, per square inch, which prevail, under normal operating conditions, within the crucible.

A discharge nozzle 15 for zinc vapor is centrally mounted in the top of the crucible and extends through the cover 12, the insulating material 14 and the roof 13. This nozzle has an aperture of the proper size for conveying the metallic zinc vapor at the desired velocity from within the crucible to the oxidizing environment or zinc-combusting zone. The cover 12, heat insulating material 14 and roof 13 are of electrical insulating material, while the nozzle 15 is electrically conductive and serves as one electrode or terminal for the application of electric energy to the superheating of the metallic zinc vapor.

An electrical conductor 16 extends through the cover 12, insulating material 14 and roof 13 and may be hollow as shown so as to serve for the introduction of molten zinc into the crucible. The hollow conductor or tube 16 extends downwardly into contact with the mass of metallic zinc 11 in the crucible.

The nozzle 15 and tube 16 are connected to a suitable source of electric energy 17, which may be either direct or alternating, and the magnitude of the electric current may be controlled by suitable agencies such, for example, as a rheostat 18. The nozzle 15 and tube 16 thus function as electrodes, and in addition to being electrically conductive must be made of suitable material to resist the high temperatures prevailing in the crucible, and we have found graphite suitable for this purpose.

The crucible 10 is mounted in a brick furnace structure 19 and is heated by the products of combustion of burning fuel (such as coal) on a grate 21. A melting pot 20 is also arranged in the furnace structure 19 within the influence of the hot products of combustion after they have passed the crucible 10. The metallic zinc is thus melted in the melting pot 20 and is poured, in a molten condition, through the tube 16 into the crucible 10. It is our preferred practice to bring the zinc to approximately its boiling temperature in the pot 20. By this arrangement of apparatus the heat required for melting and boiling the zinc is furnished by the combustion of coal on the grate 21, and the desired superheating of the zinc vapor in the crucible 10 is effected by the electric energy consumed within the crucible between the electrodes 15 and 16.

A pipe or flue 22 is arranged above the top of the crucible 10 and is provided with a lower flared portion 23 which terminates at its bottom a distance of about twelve inches above the discharge orifice of the nozzle 15. A fan or blower 24 is operatively connected to the pipe 22 and assists in drawing upwardly through the pipe the large volumes of cooling air required in the practice of the invention for maintaining the heat absorbing media surrounding the combustion or reaction zone at the required temperatures. A bag house, or other appropriate instrumentality, is operatively associated with the pipe 22 and blower 24 for the collection of the zinc oxide.

In the preferred practice of the method of the invention in the apparatus illustrated in the drawing, molten zinc approximately at the boiling temperature is poured into the crucible 10 through the tube 16. The space between the top surface of the molten zinc in the crucible 10 and the roof 13 becomes filled with metallic zinc vapor, and this vapor is superheated by the passage of the electric current between the electrode 15 and the surface of the molten zinc 11 to a temperature preferably in excess of 2000° C.

In the actual practice of the invention, we have secured excellent results with an apparatus of the following description operated under the following conditions. The crucible 10 consisted of a No. 125 Dixon graphite crucible. The nozzle (electrode) 15 consisted of a four inch graphite tube, thirteen inches long with a bore of one and three-quarters inches. The temperature of the hot gases (derived from the burning fuel on the grate 21) surrounding the crucible 10 was about 1200° C. An electric current of about 800 amperes was maintained in the apparatus with an alternating potential across the electrodes (15 and 16) of about 20 volts. The volume of cooling air used was about 300 cubic feet per minute and the temperature of the zinc oxide laden gases fifteen feet above the outlet of the nozzle 15 was about 45° C. About fifty pounds of metallic zinc were distilled off per hour. Under these conditions, metallic zinc vapor is forced thorugh the nozzle 15 at a relatively high velocity due to the pressure of the concentrated zinc vapor within the crucible 10.

On leaving the nozzle 15 the superheated zinc vapor begins to combine with the surrounding oxygen of the air, raising the temperature of combustion and of the zinc oxide formed to a very high point, so high that probably considerable of the zinc oxide when generated exists as a true gas. The relatively large volume occupied by the rarified gases due to their high temperature, and the low temperatures of the surrounding heat-absorbing media, however, greatly facilitate the heat interchange, so that the condensation of gaseous zinc oxide to solid zinc oxide takes place almost instantaneously. It is our belief that this sudden condensation of gas with the accompanying inrush of air pockets, followed by another expansion and contraction as the stream of issuing zinc vapor continues, is the cause of the sputtering and snapping zinc-combusting flame characteristic of our preferred practice. The heat carried and generated by the combusting zinc vapor and the products of combustion are removed from the oxidizing environment in the shortest possible time. The desired result can be obtained by properly regulating the amount of cooling air drawn upwardly through the pipe 22. The cooling air drawn into the pipe 22 serves not only to directly cool the products of combustion (principally zinc oxide) but serves also to remove the heat from the surrounding heat-absorbing media and thereby prevents the building up of temperatures which would decrease their rate of heat absorption. By heat-absorbing media we mean the radiant energy absorbing bodies surrounding or thermally related to the oxidizing environment together with the cooling air which latter absorbs heat largely by conduction.

Metallic zinc boils at a temperature of about 918° C., and the superheating of the zinc vapor contemplated by the method of our invention involves heating the zinc vapor to a temperature considerably above 918° C.; our preferred practice being to superheat the zinc vapor to a temperature above 2000° C. The superheated zinc vapor oxidizes or burns with an elongated flame, which, when surrounded with a draft of cooling air of the character hereinbefore described, sputters and snaps in an explosive manner.

In practicing the method of the invention for the production of our improved zinc oxide two fundamental conditions should be realized and maintained, namely, (1) the zinc vapor should be oxidized or burned in such a manner as to produce particles of zinc oxide of the desired extreme fineness and (2) the products of oxidation or combustion should be cooled in such an interval of time as to substantially prevent sublimation and growth of the particles of zinc oxide after their formation. In practice, we have found that these conditions are satisfactorily realized and maintained when the heat-absorbing media thermally related to or surrounding the environment in which a superheated zinc vapor is oxidized are of sufficient heat-absorbing capacity to effect the removal of the heat carried and generated by the combusting zinc vapor and the products of combustion in the necessary short interval of time required to cool the resulting zinc oxide without substantial sublimation and growth of the particles thereof after their formation. Thus, when the environment of combusting zinc vapor (which may be defined as the volume of the oxidizing or burning flame) is surrounded by a draft of cooling air of the appropriate volume to maintain itself and the surrounding radiant energy absorbing bodies at relatively low temperatures, heat is so rapidly removed from the environment of oxidation or combustion that the resulting zinc oxide is cooled without substantial sublimation and growth of particle size, and at the same time the oxidizing or burning zinc flame is caused to sputter and snap in the characteristic fashion which we have found to be indicative of the formation of zinc oxide particles of extreme fineness.

Zinc oxide produced in the manner hereinbefore particularly described is characterized by its superior capacity for imparting to compounded rubber resistance to abrasive wear when employed therein as a strengthening or reinforcing agent. Thus, if two rubber compounds be made up of the composition of the standard test compound specified in the aforementioned article in the Rubber Age, one containing the well known special grade Horsehead brand zinc oxide, and the other containing an equal weight of zinc oxide produced as hereinbefore particularly described, and these two rubber stocks are properly cured, the relative resistance to abrasion of the rubber stock made with the new zinc oxide as compared with the rubber stock made with the special grade Horsehead brand zinc oxide will be in the ratio of 120 (or more) to 100. In other words, zinc oxide produced by the method and under the conditions hereinbefore particularly described has the capacity of imparting to compounded rubber a resistance to abrasive wear at least 20% greater than that of special grade Horsehead brand zinc oxide. The Horsehead brand zinc oxide has been most extensively used in the rubber industry for many years, and the special grade has been the accepted standard of uniformity in zince oxide for rubber compounding over a number of years. This zinc oxide has been made for many years by the well-known American or Wetherill process from the unique franklinite ore of the Franklin Mine in New Jersey, U. S. A. The properties and uniformity of this oxide are well recognized and are referred to in standard authorities on pigments. This zinc oxide has a particle size of about 0.5 micron, a lead content of about 0.15%, expressed as PbO, and a total sulfur content of from 0.3 to 0.4%, expressed as $SO_3$.

The following tables indicate the results of two determinations on the aforementioned abrasion machine, using in determination No. 1 special grade Horsehead brand zinc oxide and in determination No. 2 a zinc oxide produced by the method and under the conditions hereinbefore particularly described; the specimens of compounded rubber employed in these determinations being of the composition of the standard test compound hereinbefore mentioned:

*Determination No. 1.*

Special grade Horsehead brand zinc oxide.

| Time of cure mins. at 141° C. | Tensile strength lbs. per sq. in. | Per cent elongation. | Abrasion resistance. |
|---|---|---|---|
| 45 | 2,980 | 657 | 56 |
| 60 | 3,015 | 622 | 71 |
| 75 | 3,095 | 619 | 81 |
| 90 | 3,240 | 625 | 101 |
| 105 | 3,425 | 623 | 117 |
| 120 | 3,048 | 602 | 124 |

*Determination No. 2.*

Zinc oxide of the invention.

| 45 | 2,920 | 673 | 52 |
|---|---|---|---|
| 60 | 3,260 | 673 | 79 |
| 75 | 3,425 | 667 | 106 |
| 90 | 3,505 | 664 | 155 |
| 105 | 3,500 | 648 | 164 |
| 120 | 3,270 | 634 | 183 |

In the foregoing determinations, the correct time of cures to compare is not easy to choose, but the commonly chosen optimum cure is when the product of the tensile strength and elongation is a maximum. On this basis we would compare the 105 minute cure of the stock compounded with special grade Horsehead brand zinc oxide with the 90 minute cure of the stock compounded with the zinc oxide of the invention. The corresponding abrasive resistances are 117 and 155 respectively, or relatively 100 to 132. In actual practice, tire treads are usually cured slightly harder, in which case we would compare the 120 and 105 minute cures with the corresponding abrasive resistances of 124 and 164 or relatively 100 to 132. In other words, this particular zinc oxide, made in accordance with the invention, has the capacity of imparting to compounded rubber a resistance to abrasive wear approximately 32% greater than that of the special grade Horsehead brand zinc oxide.

Zinc oxide produced by the method and under the conditions hereinbefore particularly described is moreover characterized by an extremely fine particle size. Thus, such zinc oxide is of a particle size very considerably finer or smaller than the particle size of the present day standard high grades of zinc oxide produced by either the American process or the French process and when produced under favorable conditions such zinc oxide is of a particle size not exceeding about 0.25 micron. In practicing the method of the invention under favorable conditions, we have obtained a zinc oxide product of such fineness that the diameter of the average particle is below the resolving power of the microscopical equipment hereinafter described, which is approximately 0.25 micron.

The best commercial grades of American process zinc oxide which we have examined have an average particle size of from 0.38 to about 0.52 micron (0.001 millimeter) while the best commercial grades of French process zinc oxide which we have examined have an average particle size of from about 0.36 to about 0.44 micron, and we have found no such zinc oxide in which the average particle size was of the order of magnitude of 0.25 micron.

The definition and determination of the "particle size" of zinc oxide is rendered difficult because of the extreme fineness of the particles. For example, a zinc oxide, the particles of which have an average diameter of 0.4 micron, will consist of over five trillions (5,000,000,000,000) of particles per gram. Throughout this specification and the appended claims, when we speak of "particle size", we mean the diameter of the average particle. Thus, where it is herein stated that a particular zinc oxide has an average particle size of 0.52 micron, it is meant that this numerical figure is the diameter in microns of the average particle. One may speak definitely of the diameter of a sphere, in the case of a pound of fine spherical shot, each shot equal in regard to volume, and then if the diameter of one shot is known, it can be stated that the length of this diameter is the particle size of the entire pound of material. However, in the case of zinc oxide, we are dealing neither with spheres nor with a substance whose particles are perfectly uniform; and hence the meaning of "particle size" is less definite than in the case of uniform spheres. For the purposes of this specification and the appended claims, we will define the diameter of a particle as the harmonic mean of the three cubical dimensions which is derived from measurements of the three cubical dimensions. The numerical values of particle size (diameter of the average particle) given in this specification have been determined by photomicrographing with blue light (with a 2 millimeter homogeneous immersion apochromatic lens of 1.3 numerical aperture and at a magnification of 1500 diameters) specimens which have been properly dispersed in glycerine. These determinations have been made in accordance with the procedure described in the paper by Henry Green, Journal of the Franklin Institute, November, 1921, pages 637–666.

The effect of decreasing the particle size of zinc oxide by as little as one-tenth of a micron can be appreciated when we consider that a gram of zinc oxide of 0.7 micron average particle size contains 0.96 trillion of particles, whereas a gram of zinc oxide of 0.6 micron average particle size contains 1.54 trillions of particles. When we get below 0.3 micron in average particle size the effect of a slight decrease in diameter of the average particle becomes enormous. For example, a gram of zinc oxide of 0.3 micron average particle size will contain roughly 12 trillions of particles and a reduction of one-tenth of a micron in the diameter of the average particle will increase the number of particles per gram to 41 trillions. The following table clearly shows the significance of the direction and magnitude of our invention in this respect:

| Diameter in microns. | Number of particles per gram in trillions. |
|---|---|
| 0.7 | .96 |
| 0.6 | 1.54 |
| 0.5 | 2.64 |
| 0.4 | 5.17 |
| 0.3 | 12.24 |
| 0.2 | 41.40 |
| 0.1 | 331.20 |

As the result of our investigation and researches, we have determined that the average particle size of a zinc oxide has a very considerable influence upon the properties of the oxide as a rubber reinforcing agent. It is our present opinion that the improved properties of the zinc oxide, made in accordance with our present invention, as a rubber reinforcing agent are probably due in large measure to its greater degree of subdivision or finer particle size. We have actually demonstrated that the finer the particle size of a zinc oxide, the greater is its reinforcing or strengthening power in rubber, and in particular its capacity for imparting to rubber resistance to abrasive wear.

While, in the light of the information derived from our resources and investigations, we attribute the increased reinforcing power of the zinc oxide made in accordance with our present invention to its greater degree of subdivision or fineness of particle size, we do not wish to restrict ourselves to this explanation or interpretation of the superior properties of the zinc oxide for imparting to compounded rubber resistance to abrasive wear. The chemical and physical properties of zinc oxide as a rubber reinforcer appear to be so intimately associated that in attributing the increased reinforcing power of the zinc oxide to particle size we may be attributing this improved property to simply one of the manifestations of a cause and not to the cause itself.

In certain of the appended claims, we have defined our improved method of making zinc oxide with respect to its applicability for producing a zinc oxide product possessing superior capacity for imparting to compounded rubber resistance to abrasive wear. This manner of defining the present invention has been adopted merely for the purpose of identifying the improved method of the invention and for clearly distinguishing this method from the heretofore customary methods of manufacturing zinc oxide.

It is to be understood that we do not intend thereby to limit the application of the present invention to the production of zinc oxide for use as a rubber reinforcer, but we aim in the appended claims to cover the application of our improved method of manufacturing zinc oxide irrespective of the particular use to which the resulting zinc oxide product is put. We have adopted, as a standard of comparison, the special grade Horsehead brand zinc oxide, whose present day quality we have hereinbefore defined, because this is the present-day recognized standard of high grade zinc oxide for rubber compounding.

We claim:—

1. The method of producing zinc oxide which comprises oxidizing a superheated metallic zinc vapor, and so rapidly removing heat from the products of the oxidation that the resulting zinc oxide has the capacity of imparting to compounded rubber a resistance to abrasive wear materially superior to that of high grade rubber reinforcing zinc oxides heretofore available.

2. The method of producing zinc oxide which comprises oxidizing a superheated metallic zinc vapor, and so rapidly removing heat from the products of the oxidation that the resulting zinc oxide has the capacity of imparting to compounded rubber a resistance to abrasive wear at least 20% greater than that of high grade rubber reinforcing zinc oxides heretofore available..

3. The method of producing zinc oxide which comprises oxidizing a superheated metallic zinc vapor, and so rapidly removing heat from the products of the oxidation that the resulting zinc oxide has an average particle size not exceeding 0.25 micron.

4. The method of producing zinc oxide which comprises volatilizing metallic zinc, superheating the resulting zinc vapor to a temperature above 2000° C., oxidizing the superheated zinc vapor so as to produce particles of zinc oxide of extreme fineness, and cooling these initially fine particles of zinc oxide substantially instantaneously after their formation.

5. The method of producing zinc oxide which comprises volatilizing metallic zinc, superheating the resulting zinc vapor to a temperature above 2000° C., oxidizing the superheated zinc vapor, and so rapidly removing heat from the products of the oxidation that the resulting zinc oxide has the capacity of imparting to compounded rubber a resistance to abrasive wear materially superior to that of high grade rubber reinforcing zinc oxides heretofore available.

6. The method of producing zinc oxide which comprises volatilizing metallic zinc, superheating the resulting zinc vapor to a temperature above 2000° C., oxidizing the superheated zinc vapor, and so rapidly removing heat from the products of the oxidation that the resulting zinc oxide has the capacity of imparting to compounded rubber a resistance to abrasive wear at least 20% greater than that of high grade rubber reinforcing zinc oxides heretofore available.

7. The method of producing zinc oxide which comprises volatilizing metallic zinc, superheating the resulting zinc vapor to a temperature above 2000° C., oxidizing the superheated zinc vapor, and so rapidly removing heat from the products of the oxidation that the resulting zinc oxide has an average particle size not exceeding 0.25 micron.

8. The method of producing zinc oxide which comprises volatilizing metallic zinc, superheating the resulting zinc vapor by means of electrical energy, oxidizing the superheated zinc vapor so as to produce particles of zinc oxide of extreme fineness, and cooling these initially fine particles of zinc oxide substantially instantaneously after their formation.

9. The method of producing zinc oxide which comprises volatilizing metallic zinc, superheating the resulting zinc vapor by means of electrical energy, oxidizing the superheated zinc vapor, and so rapidly removing heat from the products of the oxidation that the resulting zinc oxide has the capacity of imparting to compounded rubber a resistance to abrasive wear materially superior to that of high grade rubber reinforcing zinc oxides heretofore available.

10. The method of producing zinc oxide which comprises volatilizing metallic zinc, superheating the resulting zinc vapor by means of electrical energy, oxidizing the superheated zinc vapor, and so rapidly removing heat from the products of the oxidation that the resulting zinc oxide has the capacity of imparting to compounded rubber a resistance to abrasive wear at least 20% greater than that of high grade rubber reinforcing zinc oxide heretofore available.

11. The method of producing zinc oxide which comprises volatilizing metallic zinc, superheating the resulting zinc vapor by means of electrical energy, oxidizing the superheated zinc vapor, and so rapidly removing heat from the products of the oxidation that the resulting zinc oxide has an average particle size not exceeding 0.25 micron.

12. The method of producing zinc oxide which comprises volatilizing metallic zinc, superheating the resulting zinc vapor by means of electrical energy to a temperature above 2000° C., oxidizing the superheated zinc vapor so as to produce particles of zinc oxide of extreme fineness and cooling these initially fine particles of zinc oxide substantially instantaneously after their formation.

13. The method of producing zinc oxide which comprises volatilizing metallic zinc, superheating the resulting zinc vapor by means of electrical energy to a temperature above 2000° C., oxidizing the superheated zinc vapor, and so rapidly removing heat from the products of the oxidation that the resulting zinc oxide has the capacity of imparting to compounded rubber a resistance to abrasive wear materially superior to that of high grade rubber reinforcing zinc oxide heretofore available.

14. The method of producing zinc oxide which comprises volatilizing metallic zinc, superheating the resulting zinc vapor by means of electrical energy to a temperature above 2000° C., oxidizing the superheated zinc vapor, and so rapidly removing heat from the products of the oxidation that the resulting zinc oxide has the capacity of imparting to compounded rubber a resistance to abrasive wear at least 20% greater than that of high grade rubber reinforcing zinc oxides heretofore available.

15. The method of producing zinc oxide which comprises volatilizing metallic zinc, superheating the resulting zinc vapor by means of electrical energy to a temperature above 2000° C., oxidizing the superheated zinc vapor, and so rapidly removing heat from the products of the oxidation that the resulting zinc oxide has an average particle size not exceeding 0.25 micron.

16. The method of producing zinc oxide which comprises volatilizing metallic zinc, superheating the resulting zinc vapor, projecting the superheated zinc vapor at relatively high velocity into an oxidizing environment, and cooling the resulting zinc oxide substantially instantaneously after its formation.

17. The method of producing zinc oxide which comprises volatilizing metallic zinc, superheating the resulting zinc vapor to a temperature above 2000° C., projecting the superheated zinc vapor at relatively high velocity into an oxidizing environment so as to produce particles of zinc oxide of extreme fineness, and cooling these initially fine particles of zinc oxide substantially instantaneously after their formation.

18. The method of producing zinc oxide which comprises volatilizing metallic zinc, superheating the resulting zinc vapor, forcing the superheated zinc vapor at relatively high velocity into an oxidizing environment, and quickly cooling the resulting zinc oxide and thereby producing a zinc oxide product having the capacity of imparting to compounded rubber a resistance to abrasive wear materially superior to that of high grade rubber reinforcing zinc oxides heretofore available.

19. The method of producing zinc oxide which comprises volatilizing metallic zinc, superheating the resulting zinc vapor, forcing the superheated zinc vapor at relatively high velocity into an oxidizing environment, and quickly cooling the resulting zinc oxide and thereby producing a zinc oxide product having the capacity of imparting to compounded rubber a resistance to abrasive wear at least 20% greater than that of high grade rubber reinforcing zinc oxides heretofore available.

20. The method of producing zinc oxide which comprises volatilizing metallic zinc, superheating the resulting zinc vapor, projecting the superheated zinc vapor at relatively high velocity into an oxidizing environment so as to produce particles of zinc oxide of extreme fineness, and so rapidly cooling these initially fine particles of zinc oxide to a temperature at which no substantial growth in particle size takes place that the resulting zinc oxide product has an average particle size not exceeding about 0.25 micron.

21. The method of producing zinc oxide which comprises volatilizing metallic zinc, superheating the resulting zinc vapor to a temperature above 2000° C., forcing the superheated zinc vapor at relatively high velocity into an oxidizing environment, and quickly cooling the resulting zinc oxide and thereby producing a zinc oxide product having the capacity of imparting to compounded rubber a resistance to abrasive wear materially superior to that of high grade rubber reinforcing zinc oxides heretofore available.

22. The method of producing zinc oxide which comprises volatilizing metallic zinc, superheating the resulting zinc vapor to a temperature above 2000° C., forcing the superheated zinc vapor at relatively high velocity into an oxidizing environment, and quickly cooling the resulting zinc oxide and thereby producing a zinc oxide product having the capacity of imparting to compounded rubber a resistance to abrasive wear at least 20% greater than that of high grade rubber reinforcing zinc oxides heretofore available.

23. The method of producing zinc oxide which comprises volatilizing metallic zinc, superheating the resulting zinc vapor to a temperature above 2000° C., forcing the superheated zinc vapor at relatively high velocity into an oxidizing environment, and quickly cooling the resulting zinc oxide and thereby producing a zinc oxide product of an average particle size not exceeding 0.25 micron.

24. The method of producing zinc oxide which comprises volatilizing metallic zinc, superheating the resulting zinc vapor, and oxidizing the superheated zinc vapor with a sputtering and snapping flame.

25. The method of producing zinc oxide which comprises volatilizing metallic zinc, superheating the resulting zinc vapor, oxidizing the superheated zinc vapor with a sputtering and snapping flame, and quickly removing heat from the resulting zinc oxide by means of a draft of cooling air.

26. The method of producing zinc oxide which comprises volatilizing metallic zinc, superheating the resulting zinc vapor to a temperature above 2000° C., oxidizing the superheated zinc vapor with a sputtering and snapping flame, and quickly removing heat from the resulting zinc oxide by means of a draft of cooling air.

27. The method of producing zinc oxide which comprises volatilizing metallic zinc, superheating the resulting zinc vapor, and forcing the superheated zinc vapor at relatively high velocity into an oxidizing environment and there oxidizing the superheated zinc vapor with a sputtering and snapping flame.

28. The method of producing zinc oxide which comprises volatilizing metallic zinc, superheating the resulting zinc vapor to a temperature above 2000° C., and forcing the superheated zinc vapor at relatively high velocity into an oxidizing environment and there oxidizing the superheated zinc vapor with a sputtering and snapping flame.

29. The method of producing zinc oxide which comprises volatilizing metallic zinc, superheating the resulting zinc vapor, forcing the superheated zinc vapor at relatively high velocity into an oxidizing environment and there oxidizing the superheated zinc vapor with a sputtering and snapping flame, and quickly removing heat from the resulting zinc oxide by means of a draft of cooling air.

30. The method of producing zinc oxide which comprises volatilizing metallic zinc, superheating the resulting zinc vapor to a temperature above 2000° C., forcing the superheated zinc vapor at relatively high velocity into an oxidizing environment and there oxidizing the superheated zinc vapor with a sputtering and snapping flame, and quickly removing heat from the resulting zinc oxide by means of a draft of cooling air.

31. The method of reducing zinc oxide which comprises oxidizing a superheated vapor of metallic zinc so as to produce particles of zinc oxide of extreme fineness and then so rapidly cooling these particles of zinc oxide after their formation as to prevent any appreciable sublimation and growth thereof and thereby producing a zinc oxide product having the capacity of imparting to compounded rubber a resistance to abrasive wear materially superior to that of high grade rubber reinforcing zinc oxides heretofore available.

32. The method of producing zinc oxide which comprises oxidizing a superheated vapor of metallic zinc so as to produce particles of zinc oxides of extreme fineness and then so rapidly cooling these particles of zinc oxide after their formation as to prevent any appreciable sublimation and growth thereof and thereby producing a zinc oxide product having the capacity of imparting to compounded rubber a resistance to abrasive wear at least 20% greater than that of high grade rubber reinforcing zinc oxides heretofore available.

33. The method of producing zinc oxide which comprises oxidizing a superheated vapor of metallic zinc so as to produce particles of zinc oxide of extreme fineness and then so rapidly cooling these particles of zinc oxide after their formation as to prevent any appreciable sublimation and growth thereof and thereby producing a zinc oxide product of an average particle size not exceeding 0.25 micron.

34. The method of producing zinc oxide which comprises volatilizing metallic zinc, superheating the resulting zinc vapor to a temperature above 2000° C., and forcing the superheated zinc vapor at relatively high velocity into an oxidizing environment and there oxidizing the superheated zinc vapor with a sputtering and snapping flame, said oxidizing environment being thermally related to heat absorbing media of sufficient heat absorbing capacity to effect the removal of the heat carried and generated by the combusting zinc vapor and the products of combustion in such an interval of time that the resulting zinc oxide product has the capacity of imparting to compounded rubber a resistance to abrasive wear materially superior to that of high grade rubber reinforcing zinc oxide heretofore avilable.

35. The method of producing zinc oxide which comprises volatilizing metallic zinc, superheating the resulting zinc vapor to a temperature above 2000° C., and forcing the superheated zinc vapor at relatively high velocity into an oxidizing environment and there oxidizing the superheated zinc vapor with a sputtering and snapping flame, said oxidizing environment being thermally related to heat absorbing media of sufficient heat absorbing capacity to effect the removal of the heat carried and generated by the combusting zinc vapor and the products of combustion in such an interval of time that the resulting zinc oxide product has the capacity of imparting to compounded rubber a resistance to abrasive wear at least 20% greater than that of high grade rubber reinforcing zinc oxides heretofore available.

36. The method of producing zinc oxide which comprises volatilizing metallic zinc, superheating the resulting zinc vapor to a temperature above 2000° C., and forcing the superheated zinc vapor at relatively high velocity into an oxidizing environment and there oxidizing the superheated zinc vapor with a sputtering and snapping flame, said oxidizing environment being thermally related to heat absorbing media of sufficient heat absorbing capacity to effect the removal of the heat carried and generated by the combusting zinc vapor and the products of combustion in such an interval of time that the average particle size of the resulting zinc oxide product does not exceed 0.25 micron.

37. The method of producing zinc oxide which comprises oxidizing metallic zinc vapor in an environment thermally related to heat absorbing media of sufficent heat absorbing capacity to effect the removal of the heat carried and generated by the combusting zinc vapor and the products of combustion in such an interval of time that the resulting zinc oxide product has the capacity of imparting to compounded rubber a resistance to abrasive wear materially superior to that of high grade rubber reinforcing zinc oxides heretofore available.

38. The method of producing zinc oxide which comprises oxidizing metallic zinc vapor in an environment thermally related to heat absorbing media of sufficient heat absorbing capacity to effect the removal of the heat carried and generated by the combusting zinc vapor and the products of combustion in such an interval of time that the resulting zinc oxide product has the capacity of imparting to compounded rubber a resistance to abrasive wear at least 20% greater than that of high grade rubber reinforcing zinc oxides heretofore available.

39. The method of producing zinc oxide which comprises oxidizing metallic zinc vapor so as to produce particles of zinc oxide of extreme fineness, and so rapidly cooling these initially fine particles of zinc oxide by an appropriate draft of cooling air to a temperature at which no substantial growth in particle size takes place that the resulting zinc oxide product has an average particle size not exceeding about 0.25 micron.

40. The method of producing zinc oxide which comprises oxidizing metallic zinc vapor in an environment surrounded by a draft of cooling air of appropriate volume to maintain itself and the surrounding radiant energy absorbing bodies at relatively low temperatures whereby the resulting zinc oxide product has the capacity of imparting to compounded rubber a resistance to abrasive wear materially superior to that of high grade rubber reinforcing zinc oxides heretofore available.

41. The method of producing zinc oxide which comprises oxidizing metallic zinc vapor in an environment surrounded by a draft of cooling air of appropriate volume to maintain itself and the surrounding radiant energy absorbing bodies at relatively low temperatures whereby the resulting zinc oxide product has the capacity of imparting to compounded rubber a resistance to abrasive wear at least 20% greater than that of high grade rubber reinforcing zinc oxides heretofore available.

42. The method of producing zinc oxide which comprises oxidizing metallic zinc vapor under conditions resulting in the initial formation of particles of zinc oxide of extreme fineness, and surrounding the oxidizing zinc vapor and the resulting particles of zinc oxide with a draft of cooling air of appropriate volume to maintain itself and the surrounding radiant energy absorbing bodies at such low temperatures that the initially fine particles of zinc oxide are cooled substantially instantaneously after their formation to a temperature at which no substantial growth in particle size takes place.

In testimony whereof we affix our signatures.

FRANK G. BREYER.
EARL C. GASKILL.
JAMES A. SINGMASTER.